Oct. 31, 1950 W. J. MILLER 2,527,566
ELECTRIC COOKING WELL ASSEMBLY
Filed Dec. 22, 1948 2 Sheets-Sheet 1

INVENTOR
WILLIAM J. MILLER
BY
F. R. Geisler
ATTORNEY

Oct. 31, 1950      W. J. MILLER      2,527,566

ELECTRIC COOKING WELL ASSEMBLY

Filed Dec. 22, 1948      2 Sheets-Sheet 2

INVENTOR
WILLIAM J. MILLER
BY
F. A. Geisler.
ATTORNEY

Patented Oct. 31, 1950

2,527,566

UNITED STATES PATENT OFFICE 2,527,566

ELECTRIC COOKING WELL ASSEMBLY

William J. Miller, Portland, Oreg., assignor of one-half to Dorothy H. Vrooman, Portland, Oreg.

Application December 22, 1948, Serial No. 66,637

3 Claims. (Cl. 219—37)

This invention relates to electric cookers, cooking stoves and ranges, and, more particularly, to what is familiarly known as a "deep well" type of electric cooker, which is now frequently made a part of the equipment of a modern electric range.

As is generally known, an electric cooking well includes a cylindrical cavity or shell, usually located at the top or cooking surface of an electric range, and extending downwardly therefrom, with an electric heating element adjustably mounted within the well so that the heating element may be raised or lowered as desired. By adjusting the height of the heating element within the well not only can cooking utensils of different depth be accommodated but also the heating element may either be placed in immediate contact with the bottom of a cooking utensil or may be moved downwardly therefrom so as to cause the utensil to be heated through the medium of a column of air when this is preferred.

An object of this invention is to provide an improved electric cooking well assembly in which the heating element can be quickly and easily positioned at any desired height within the well.

Another object of this invention is to provide an improved and simplified means in an electric cooking well for adjusting and maintaining the element at any desired position.

A further object of this invention is to provide an electric cooking well assembly which may be easily installed as an appliance in any electric cooking range and which will be very simple and inexpensive to manufacture, and in which only a minimum number of moving parts will be required.

These objects and other advantages I attain by constructing and arranging my cooking well appliance as hereinafter briefly described with reference to the accompanying drawings.

In the drawings, in which like reference characters indicate like parts throughout the several views; Fig. 1 is a perspective view of an electric cooking range illustrating my electric cooking well installed therein;

Figure 1:
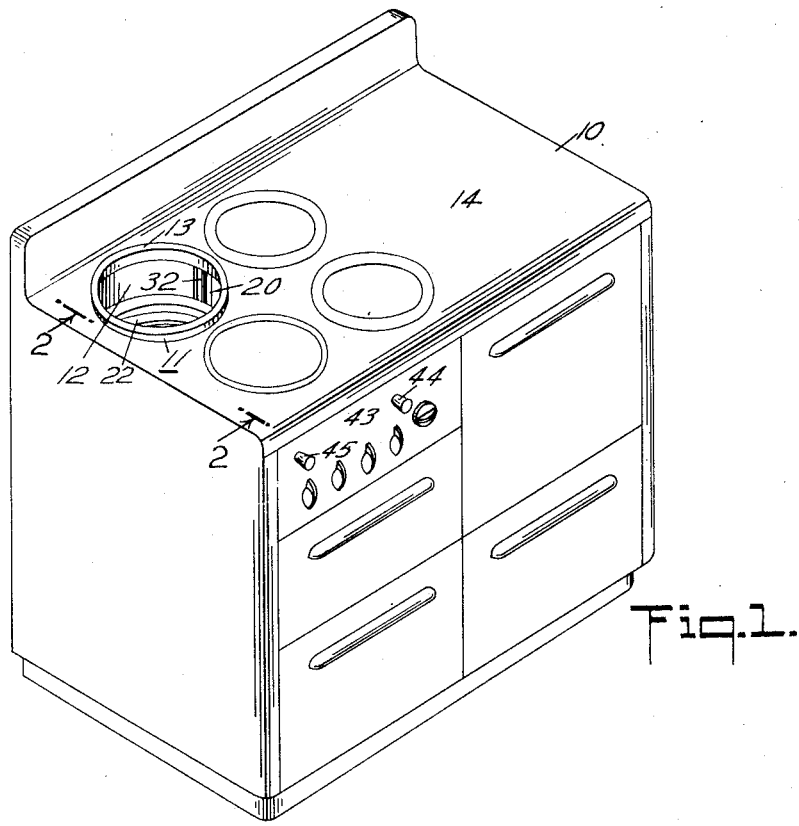
Figure 2:
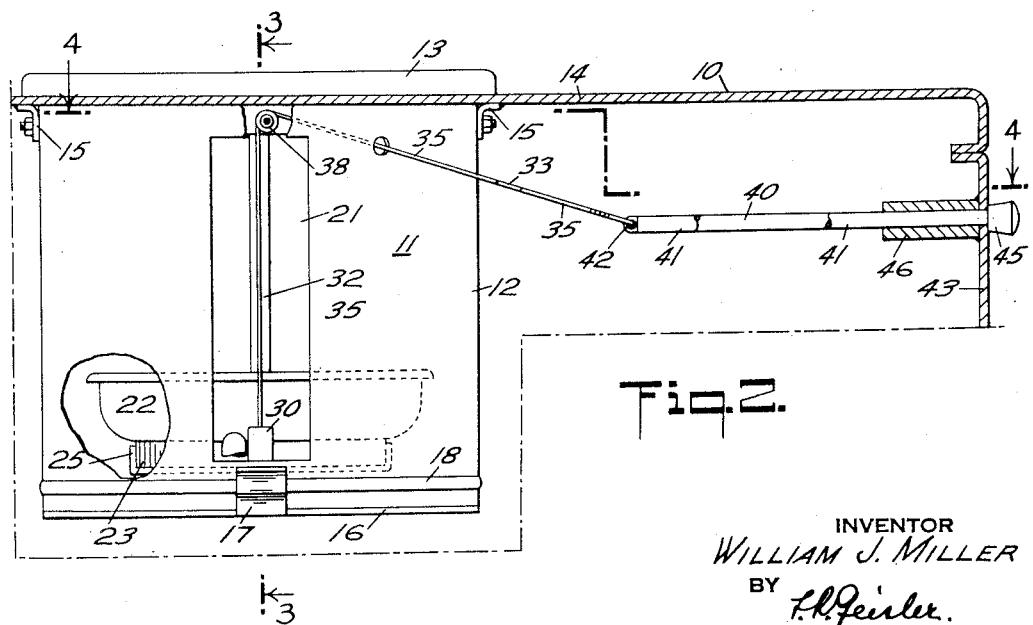
Fig. 2 is a fragmentary vertical section of the cooking range taken on line 2—2 of Fig. 1, but drawn to a larger scale.
Figure 3:
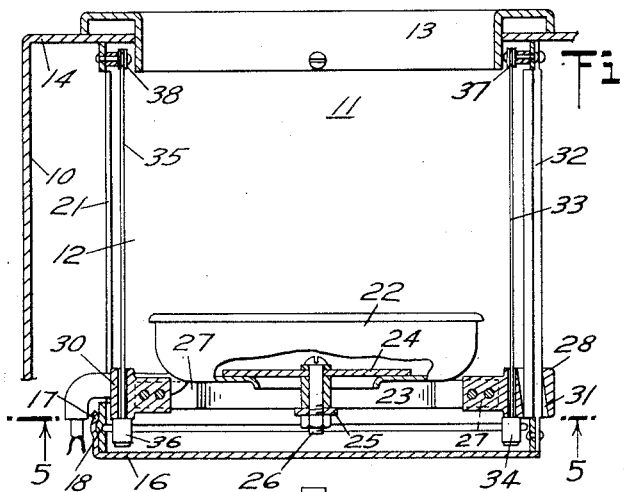
Fig. 3 is a vertical section through the cooking well taken on line 3—3 of Fig. 2.
Figure 5:
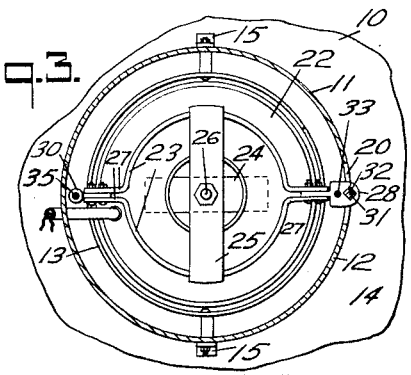
Fig. 5 is a plan section on line 5—5 of Fig. 3 but drawn to a slightly smaller scale.
Figure 4:
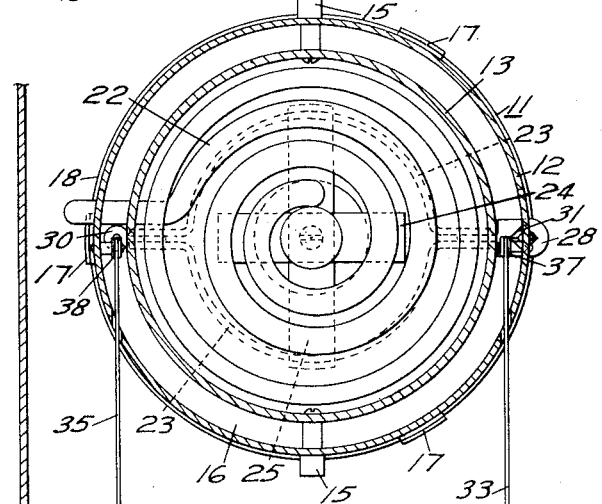
Fig. 4 is a plan section on line 4—4 of Fig. 2.

In carrying out my invention with an electric cooking well as herein described, 10 (Fig. 1) represents an electric cooking stove or range having a deep well cooker indicated in general by the reference character 11 and constructed and arranged in accordance with my invention. The deep well cooker 11 includes a cylindrical housing 12 attached at the top to a flanged apron 13. The flanged apron is generally U-shaped in cross section (Fig. 3) and the cylindrical housing 12 is outwardly spaced from the inner vertical flange of the apron 13. The housing 12 and apron 13 are secured to the top deck 14 of the electric range by means of brackets 15 (Figs. 2 and 4). Bolts secure the housing 12 and apron 13 to one ear on each bracket, the other ear of each bracket being welded or otherwise secured to the underside of the top deck 14 of the range.

A bottom pan or plate 16, which is removable for cleaning purposes, is mounted on the bottom of the cylindrical housing 12. The bottom pan 16 is provided with a plurality of upwardly-extending ears 17 (Figs. 2 and 4) which snap over a circumferential rib 18 on the lower portion of the housing 12. Two diametrically opposite vertical slots 20 and 21 are made in the housing 12 to accommodate certain members of the movable heating element assembly to be presently explained.

A cradle 23, consisting of two curved bars with their ends secured together, support the electric heating element which is indicated in general by the reference character 22 and which supplies the heat in the cooking well. The heating element 22 includes an outer annular shell or pan and suitable insulating or supporting parts and may be of any standard type used in elctric ranges and consequently need not be especially described. This heating element and its shell are removably secured to the cradle 23 by an upper clamping bar 24 (Fig. 3) and a bottom clamping bar 25 beneath the cradle, these two clamping bars being clamped in position by the connecting bolt 26. Other means of removably securing the heating element to the cradle might be employed. The ends of the cradle 23 terminate in outwardly-extending ears 27. A mounting bracket 28 is bolted between one pair of ears 27 and a control arm 30 is bolted between the opposite pair of ears 27. The mounting bracket 28 is provided with a square-shaped bore 31 (Fig. 3), which is angularly divergent from the vertical when the cradle 23 is in horizontal position. The square-shaped bore 31 is of sufficient dimension to accommodate a vertical rod 32, which rod is square in cross section, when the cradle is in horizontal position. The vertical square rod 32 is positioned in the center of the vertical slot 20 of the cylindrical housing 12, and is secured in such position by bolts which extend through flattened top and bottom ends of the rod and through the housing wall above and below the ends of the vertical slot 20. A flexible cable or chain 33 extends up through another bore, located inwardly in the mounting bracket 28, and the bottom end of the cable or chain 33 is secured below the bracket to a weight block 34 (Fig. 3). This cable or chain 33 extends upwardly from the bracket 28 parallel to, and inwardly spaced from, the square rod 32, and the cable or chain then passes over a small pulley 37 mounted within the top of the housing 12 and underneath the apron 13 as shown in Fig. 3.

A similar flexible cable or chain 35 passes upward through a bore in the control arm 30, the bottom end of this cable or chain 35 being secured similarly to a weight block 36 beneath the arm 30, and this cable or chain 35 similarly passes over a small pulley 38 mounted within the top of the housing 12 diametrically opposite the pulley 37.

The cables or chains 33 and 35 (Figs. 2 and 4) after passing over the pulleys 37 and 38 respectively, are attached to the inner ends of operating rods 40 and 41 respectively, through suitable eyelets 42 on the inner ends of these rods. The operating rods 40 and 41 are preferably substantially horizontal and are slidably mounted in sleeves 46. These sleeves 46 may be secured at any desired location and, in the range which I have illustrated, are secured on the inside of the front plate 43. The outer ends of the rods 40 and 41 are formed with enlarged knobs 44 and 45 respectively to afford a convenient hand-hold.

An electric cord, containing the usual pair of conductor wires, is connected to the outer end of the heating element 22 and passes through the vertical slot 21 in the housing 12.

Figure 6:
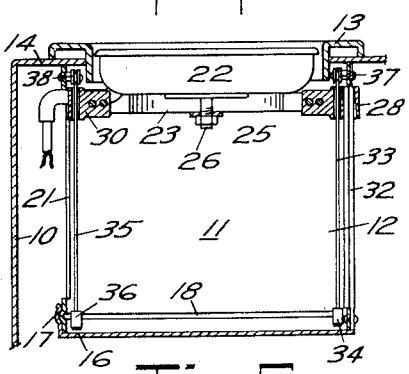
Fig. 6 is a vertical section similar to Fig. 3 but drawn to a smaller scale, and showing the movable heating element in its uppermost position.

The positioning of the heating element within the cooking well is accomplished in the following manner: Let it be assumed that the heating element is in the bottom of the well in the position illustrated in Fig. 3. The knob 44 of the operating rod 40 is pulled out thereby causing the chain 33, passing over the pulley 37, to exert an upward pull on the cradle 23. If this pull is continued the cradle 23 is caused to slide upwardly on the square rod 32. The extent to which the knob 44 is manually pulled outwardly will then determine the height to which the cradle 23 is raised in the cooking well. Let it be assumed that the raising of the cradle continues until the cradle reaches its highest position as illustrated in Fig. 6 with the heating element substantially even with the top cooking surface of the range. When the heating element has been raised to the desired position the manual pull on the knob is released, the chain will then slide down through the bore in the bracket 28 due to the pull of the weight 34 on the bottom end of the chain causing the operating rod 40 to slide back into its normal original position. However, the cradle 23, instead of sliding downwarldly on the square rod 32 will be held horizontally in its raised position, as illustrated in Fig. 6, due to the fact that the walls of the square bore 31 in the mounting bracket 28 will grip the square rod 22 at the bottom and top edges at opposite sides of the bore, and this grip on the square rod will be maintained by the weight of the cradle 23 and heating element 22 as long as the cradle remains in the horizontal position.

When it is desired to lower the heating element in the cooking well, the other knob 45 is pulled out until the resulting pull on the chain 35 causes that chain to lift the corresponding end of the cradle 23 and thus tilt the cradle upwardly slightly from the horizontal. When this upward tipping of the cradle takes place, the bore 31 of the bracket 28 will be brought more nearly into parallelism with the square rod 32 and the cradle 23 will then be free to slide downwardly on the rod 32 as long as this continues, as illustrated in Fig. 7.

Figure 7:
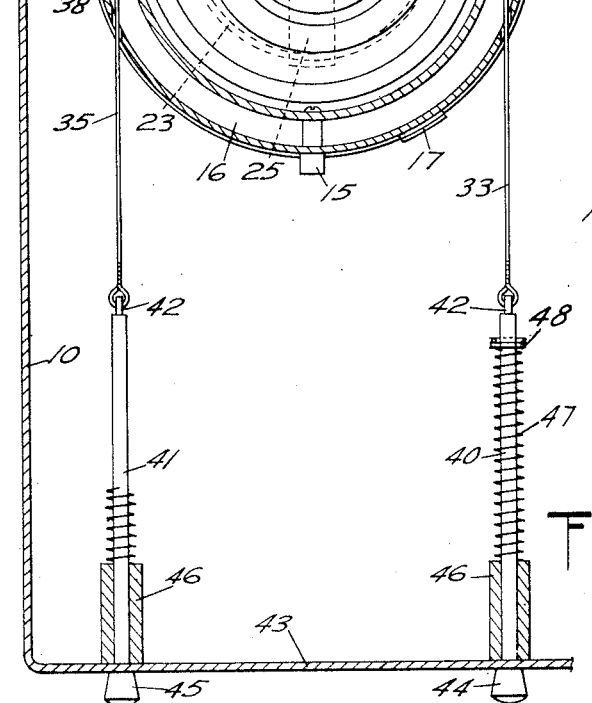
Fig. 7 is a similar vertical section showing the movable heating element of Fig. 6 in the process of being lowered.

It will now be apparent from Figs. 3, 6 and 7, and from the preceding brief description, that the cradle 23 and consequently the heating element 22 can be position at the bottom or top of the cooking well or at any location in between, if desired, merely by manipulating the knob 44 when the cradle is to be raised, or by manipulating the knob 45 when the cradle is to be lowered. Since the cradle-supporting rod 32 is square in cross section and the bore 31 is correspondingly shaped and only slightly larger than the cross section of the rod, there will be no appreciable lateral sway of the cradle on the supporting rod 32. Consequently only a single supporting rod is required for the cradle, thus minimizing the number of parts necessary for supporting the heating element in the cooking well assembly. The simple gripping principle which I employ for holding the cradle and heating element at any desired height on the rod 32 eliminates all necessity for the various elaborate and more complicated means which have heretofore been considered necessary for positioning the heating element in a cooking well, and my deep well assembly is suitable for manufacturing as a separate, simple and inexpensive attachment adapted to be easily installed in any standard electric cooking stove or range.

If desired, in order to facilitate the return of the operating rods 40 and 41 to their normal inner positions, a coil spring, such as that indicated at 47 on the rod 40 in Fig. 4, can be placed on each of the operating rods and held under compression between the inner end of the sleeve 46 and a suitable pin and washer secured on the rod, such as that indicated at 48.

Various modifications in the construction and arrangement of the individual parts of my cooking well assembly or appliance would of course be possible within the scope of my invention without departing from the principle of the invention.

I claim:

1. In an electric cooking well, adjustable supporting means for the electric heating element including a substantially vertical mounting rod located at one side of said well, an element-supporting frame slidable on said rod and normally positioned horizontally, a bore extending upwardly through one end of said frame at an angle slightly less than 90° with respect to the plane of said frame, said bore being similar in cross section to the cross section of said rod, the inclination of said bore being such that the upper and lower opposite edges of said bore will exert a gripping hold on said rod when said frame is in horizontal position but will permit said frame to slide on said rod when said frame is tilted slightly upwardly from horizontal position, means adapted to engage said frame near said bore for enabling a manual pull to be exerted in an upward direction on said frame, whereby to cause said frame to slide upwardly on said rod, and means at the opposite end of said frame for enabling a manual pull to be exerted in an upward direction on said opposite end to cause said frame to be tilted slightly upwardly from normal horizontal position whereby to permit said frame to slide downwardly on said rod.

2. In an electric cooking well of the character described, adjustable supporting means for the electric heating element comprising a substantially vertical mounting rod located at one side of said well, said rod being rectangular in cross section, a mounting bracket slidable on said rod, a cradle for said electric heating element rigidly secured at one end to said mounting bracket and normally positioned horizontally, a bore extending upwardly through said bracket at an angle slightly less than 90° with respect to the plane of said cradle, said bore being substantially rectangular in cross section, the inclination of said bore being such that the upper and lower opposite edges of said bore will exert a gripping hold on said rod when said cradle is in horizontal position but will permit said bracket to slide on said rod when said cradle is tilted slightly upwardly from horizontal position, means connected with said bracket near said bore for enabling a manual pull to be exerted in an upward direction on said bracket, whereby to cause said bracket and cradle to slide upwardly on said rod, and means at the opposite end of said cradle for enabling a manual pull to be exerted in an upward direction on said opposite end to cause said cradle to be tilted slightly upwardly from normal horizontal position whereby to permit said cradle and bracket to slide downwardly on said rod.

3. In an electric cooking well of the character described, adjustable supporting means for the electric heating element comprising a substantially vertical mounting rod located at one side of said well, said rod being square in cross section, a mounting bracket slidable on said rod, a cradle for said electric heating element rigidly secured at one end to said mounting bracket and normally positioned horizontally, a bore extending upwardly through said bracket at an angle slightly less than 90° with respect to the plane of said cradle, said bore being substantially square in cross section, the inclination of said bore being such that the upper and lower opposite edges of said bore will exert a gripping hold on said rod when said cradle is in horizontal position but will permit said bracket to slide on said rod when said cradle is tilted slightly upwardly from horizontal position, means including a flexible element arranged to engage said bracket for enabling a manual pull to be exerted in an upward direction on said bracket, whereby to cause said bracket and cradle to slide upwardly on said rod, and similar means at the opposite end of said cradle for enabling a manual pull to be exerted in an upward direction on said opposite end to cause said cradle to be tilted slightly upwardly from normal horizontal position whereby to permit said cradle and bracket to slide downwardly on said rod.

WILLIAM J. MILLER.

REFERENCES CITED

The following references are of record in the file of this patent:

UNITED STATES PATENTS

| Number | Name | Date |
| --- | --- | --- |
| 848,991 | Harvey | Apr. 2, 1907 |
| 2,025,252 | Stencell | Dec. 24, 1935 |
| 2,257,580 | Trompeter | Sept. 30, 1941 |
| 2,416,645 | Rutenber | Feb. 25, 1947 |
| 2,449,424 | Stieber | Sept. 14, 1948 |